United States Patent Office 3,775,463
Patented Nov. 27, 1973

3,775,463
N-PHENYL-N'-ALKOXY ESTER UREAS
Adolf Fischer, Mutterstadt, Pfalz, Karl-Heinz Koenig, Ludwigshafen (Rhine), Gustav Steinbrunn, Schwegenheim, Pfalz, and Albrecht Zschocke, Bad Duerkheim, Germany, assignors to Badische Anilin- & Soda-Fabrik Aktiengesellschaft, Ludwigshafen (Rhine), Germany
No Drawing. Application July 13, 1970, Ser. No. 54,657, now abandoned, which is a division of application Ser. No. 652,034, July 10, 1967, now Patent No. 3,621,055. Divided and this application May 16, 1972, Ser. No. 253,786
Int. Cl. C07c 127/18
U.S. Cl. 260—471 A      4 Claims

ABSTRACT OF THE DISCLOSURE

N-phenyl-N'-alkoxy ester urea compounds having herbicidal properties.

RELATED APPLICATIONS

This application is a division of our copending application Ser. No. 54,657, filed July 13, 1970 now abandoned, which in turn is a division of our application Ser. No. 652,034, filed July 10, 1967 now Pat. No. 3,621,055.

THE INVENTION

The present invention relates to urea derivatives, in particular N-phenylurea derivatives containing N'-substituted-alkoxy groups in turn having a carboxy ester group, and to methods of controlling undesirable plant growth with these compounds.

It is known that trisubstituted ureas, e.g., N-p-chlorophenyl-N'-N'-dimethylurea and N-4-chlorophenyl-N'-methyl-N'-methoxyurea, may be used as the active ingredients of herbicides. However their action is not satisfactory.

An object of the invention is to provide new phenylurea derivatives. Another object of the invention is to provide valuable new phenylurea derivatives containing carboxy groups. A further object of the invention is to provide valuable new phenylurea derivatives containing ester groups. Yet another object of the invention is to provide a method of controlling unwanted plant growth without injuring crop plants and a method for controlling all plants over a specific area.

These and other objects of the invention are achieved with compounds having the formula

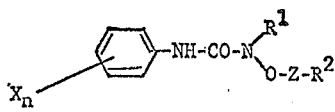

in which X denotes halogen or a nitro, cyano, trifluoromethyl, methoxy, methylsulfonyl, lower alkyl or lower alkoxy group or a phenoxy group which may be substituted by chlorine, the X radicals being identical or different and $n$ denotes one of the integers 0 to 3, $R^1$ denotes hydrogen, a lower aliphatic radical which may be substituted by chlorine or a cycloalkyl radical which may be substituted by methyl, Z denotes a linear or branched aliphatic radical (alkylene) which may be substituted by halogen and $R^2$ denotes an alkoxycarbonyl, cycloalkoxycarbonyl or aryloxycarbonyl group. These compounds have a good herbicidal action on broadleaved and grass weeds, are well tolerated by and have no injurious aftereffect on cereals, Indian corn and rice and have a rapid onset of action.

These compounds are suitable for controlling unwanted plants growing among crops without injuring the crops. Furthermore they have short residual action so that after the crop plants have been harvested new plants can be sown without suffering any injury.

By salts we mean alkali metal salts or alkaline earth metal salts, e.g., the sodium, potassium, magnesium or calcium salts, or the ammonium salts or the salts of amines, e.g., of dimethylamine, triethylamine, triethanolamine or ethanolamine.

The active ingredients may be prepared by conventional methods by reacting the alkali metal or alkaline earth metal salts of N'-hydroxyurea derivatives with halocarboxylic acid esters. The N-hydroxyurea derivatives may be prepared for example from the corresponding isocyanates and substituted hydroxylamines.

The following descriptions illustrate how the new substituted urea derivatives are prepared (parts specified are parts by weight unless otherwise stated).

N-3,4-dichlorophenyl-N'-methyl - N' - carbomethoxymethoxyurea of the formula

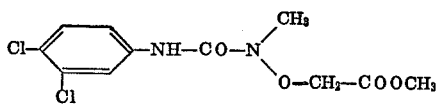

23.5 parts of N-3,4-dichlorophenyl-N'-methyl-N'-hydroxyurea is dissolved in 100 parts of ethanol and dissolved while stirring well in a solution of 4 parts of sodium hydroxide and 20 parts of water. The resulting solution is evaporated to dryness in vacuo and the residue is suspended in 100 parts of toluene and reacted with 18 parts of methyl bromoacetate at room temperature. The mixture is then stirred for several hours at 60° C., the precipitated sodium bromide is suction filtered and the filtrate is evaporated to dryness in vacuo. After being recrystallized from methanol, 24 parts of N-3,4-dichlorophenyl-N'-methyl-N'-carbomethoxymethoxyurea is obtained with a melting point of 83° to 85° C.

The other active ingredients according to the invention may be prepared by analogous methods. Depending on the acid halide or acid halide derivative used, the temperature of the esterification may be between —20° and +100° C., preferably however between 0° and 70° C.

The following substituted N'-hydroxyureas are examples of suitable starting materials in the production of the compounds according to the invention:

N-3,4-dichlorophenyl-N'-methyl-N'-hydroxyurea
N-3-chlorophenyl-N'-methyl-N'-hydroxyurea
N-4-chlorophenyl-N'-methyl-N'-hydroxyurea
N-3,4-dichlorophenyl-N'-isopropyl-N'-hydroxyurea
N-3-chlorophenyl-N'-isopropyl-N'-hydroxyurea
N-3-trifluoromethylphenyl-N'-methyl-N'-hydroxyurea
N-3-nitrophenyl-N'-methyl-N'-hydroxyurea
N-phenyl-N'-ethyl-N'-hydroxyurea
N-3-tolyl-N'-methyl-N'-hydroxyurea
N-4-(4'-chlorophenoxy)-phenyl-N'-methyl-N'-hydroxyurea.

The following compounds are suitable halocarboxylic acid esters for the production of the urea derivatives: methyl α-chloroacetate, methyl α-bromoacetate, methyl α-chloropropionate, and methyl α-bromopropionate.

The following substances are example of active ingredients according to this invention:

| X | $n$ | $R^1$ | Z | $R^2$ | Melting point, ° C. |
|---|---|---|---|---|---|
| 3,4-Cl | 2 | —CH₃ | —CH₂— | —COOCH₃ | 83–85 |
| 3,4-Cl | 2 | —CH₃ | —(CH₂)₃— | —COOCH₃ | 120–121 |

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, mineral oil fractions with medium to high boiling points, such as kerosene or diesel oil, coal-tar oils and oils of vegetable and animal origin, cyclic hydrocarbons, such as tetrahydronaphthalene, and alkylated naphthaleses are suitable.

Aqueous formulations may be prepared from emulsion concentrates, pastes or wettable powders (spray powders) by adding water or by mixing the salts with water. To prepare emulsions the ingredients as such or dissolved in a solvent may be homogenized in water by means of wetting or dispersing agents. Concentrates which are suitable for dilution with water may be prepared from active ingredient, emulsifying or dispersing agent and possible solvent. The active ingredients may also be applied as granulates.

The active ingredients may be mixed with insecticides, fungicides, bactericides and other herbicides as well as with fertilizers.

Dusts may be prepared by mixing or grinding the active ingredients with a solid carrier.

The following examples illustrate the application of the active ingredients according to this invention.

EXAMPLE

In a greenhouse the plants Indian corn (*Zea mays*), barley (*Hordeum vulgare*), wheat (*Triticum vulgare*), rice (*Oryza sativa*), small nettle (*Urtica urens*), chickweed (*Stellaria media*), white goosefoot (*Chenopodium album*), wild mustard (*Sinapis arvensis*), corn marigold (*Chrysanthemum segetum*), amaranth pigweed (*Amarantus retroflexus*), chamomile (*Matricaria chamomilla*), tartarian buckwheat (*Fagapyrum tartaricum*) and barnyard grass (*Panicum crus galli*) were treated at a growth height of the crop plants of 8 to 20 cm. and of the broadleaved and grass weeds of 2 to 6 cm. with N-3-chlorophenyl-N'-methyl-N'-carboxymethoxyurea (I) and, for comparison, with N-p-chlorophenyl-N'-methyl-N'-methoxyurea (II), each at a rate of 2 kg. of active ingredient per hectare dispersed with sodium lignin sulfonate in 500 liters of water. After three to four weeks it could be observed that I had as good a herbicidal action as II and was tolerated better by the crop plants barley, wheat, Indian corn and rice. The results of the experiment can be seen from the following table.

| Active ingredient | I | II |
|---|---|---|
| Crop plants: | | |
| Indian corn | 0-10 | 30-40 |
| Barley | 0 | 30-40 |
| Wheat | 0 | 40 |
| Rice | 0-10 | 30-40 |
| Unwanted plants: | | |
| Small nettle | 100 | 100 |
| Chickweed | 80-90 | 90 |
| White goosefoot | 90-100 | 100 |
| Wild mustard | 90-100 | 100 |
| Corn marigold | 90 | 90 |
| Amaranth pigweed | 90 | 90 |
| Chamomile | 90-100 | 90 |
| Tartarian buckwheat | 90-100 | 100 |
| Barnyard grass | 80 | 80 |

NOTE.—0=No injury; 100 complete kill.

The folowing compounds have the same biological action as active ingredient I:

N-3,4-dichlorophenyl-N'-methyl-N'-carbo(1'-ethynyl)-cyclohexoxymethoxyurea

N-4-chlorophenyl-N'-methyl-N'-carbo-(2'-methyl-4'-chloro)-phenoxymethoxyurea

The invention is hereby claimed as follows:

1. A compound having the formula

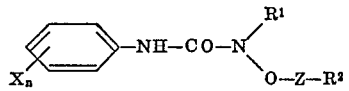

in which X denotes chloro, bromo, fluoro, iodo, trifluoromethyl, nitro, lower alkyl, lower alkoxy, phenoxy, chlorophenoxy, or methylsulfonyl, the X radicals being identical or different, $n$ denotes 0, 1, 2 or 3, $R^1$ denotes lower alkyl, or chloro substituted lower alkyl, Z denotes a lower alkylene group, and $R^2$ denotes a carbonylalkoxy group, a carbonylcycloalkoxy group, or a phenoxycarbonyl group.

2. A compound as claimed in claim 1 wherein $R^1$ is methyl and $R^2$ is $COOCH_3$.

3. A compound as claimed in claim 1 wherein $R^1$ is methyl and $R^2$ is carbo-(2'-methyl-4'-chloro)-phenoxy.

4. A compound as claimed in claim 1 wherein $R^1$ is methyl and $R^2$ is carbo-(1'-ethynyl)-cyclohexoxy.

References Cited
UNITED STATES PATENTS
3,642,891  2 1972  Teach _____ 260—471 A LORRAINE A. WEINBERGER, Primary Examiner L. A. THAXTON, Assistant Examiner U.S. Cl. X.R.

71—103, 105, 111; 260—465 D, 470

UNITED STATES PATENT OFFICE
CERTIFICATE OF CORRECTION

Patent No. 3,775,463    Dated November 27, 1973

Inventor(s) Adolf Fischer et al

It is certified that error appears in the above-identified patent and that said Letters Patent are hereby corrected as shown below:

Column 2, line 64, "example" should read -- examples --.

Column 2, lines 69-72, Table, item 3,4-Cl, column Z, "$-(CH_2)_3$" should read -- $-(CH_2)_5$ --.

Column 3, line 10, "naphthaleses" should read -- naphthalenes --.

Column 3, line 19, "possible" should read -- possibly --.

Column 3, line 40, "tartaricum" should read -- tataricum --.

Column 4, line 16, "folowing" should read -- following --.

Signed and sealed this 15th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,775,463     Dated November 27, 1973

Inventor(s) Adolf Fischer et al.

It is certified that error appears in the above-identified patent and that said Letters Patent are hereby corrected as shown below:

On the title page insert:

--[30]  Foreign Application Priority Data

July 19, 1966           Germany----- P 15 42 834.9

January 17, 1967      Germany----- P 16 42 217.6 --.

Signed and Sealed this twenty-first Day of October 1975

[SEAL]

Attest:

RUTH C. MASON
*Attesting Officer*

C. MARSHALL DANN
*Commissioner of Patents and Trademarks*